United States Patent
Melman et al.

[11] Patent Number: 5,261,017
[45] Date of Patent: Nov. 9, 1993

[54] OPTICAL WAVEGUIDE ENHANCED LASER TO FIBER COUPLING

[75] Inventors: Paul Melman, Newtown; Jagannath Chirravuri, Medfield, both of Mass.

[73] Assignee: GTE Laboratories Incorporated, Waltham, Mass.

[21] Appl. No.: 977,383

[22] Filed: Nov. 17, 1992

[51] Int. Cl.$^5$ ............................................. G02B 6/42
[52] U.S. Cl. ............................................ 385/38; 385/28; 385/49; 385/50
[58] Field of Search ................ 385/15, 28, 38, 43, 385/49, 50, 88-94

[56] References Cited

U.S. PATENT DOCUMENTS

| | | | |
|---|---|---|---|
| 3,894,789 | 7/1975 | Kobayashi et al. | 385/49 X |
| 4,199,222 | 4/1980 | Ikushima et al. | 385/88 X |
| 4,490,020 | 12/1984 | Sakaguchi et al. | 385/49 X |
| 4,768,199 | 8/1988 | Heinen et al. | 385/49 X |
| 4,795,228 | 1/1989 | Schneider | 385/43 X |

FOREIGN PATENT DOCUMENTS

| | | | |
|---|---|---|---|
| 54-110851 | 8/1979 | Japan | 385/93 |
| 63-60413 | 3/1988 | Japan | 385/88 |
| 61-300457 | 11/1988 | Japan | . |
| 4-34505 | 2/1992 | Japan | 385/49 |

Primary Examiner—John D. Lee
Attorney, Agent, or Firm—Lawrence E. Monks

[57] ABSTRACT

Apparatus for improving the coupling efficiency of a laser to a single mode fiber by means of an intermediate waveguide is disclosed. For uniform waveguides maximum improvement results when waveguide's mode field radii MFR is designed as the geometrical mean of the MFR of the laser and the MFR of the fiber. The apparatus can be extended to multi-stage couplers. Each successive stage is designed to have a spot size which is the geometric mean of the section before and after. With only a small number of stages significant improvement in coupling efficiency can be realized.

12 Claims, 5 Drawing Sheets

OPTICAL WAVEGUIDE ENHANCED LASER TO FIBER COUPLING

FIELD OF THE INVENTION

This invention relates generally to optical coupling between a laser and a single mode fiber and more particularly to apparatus to enhance the coupling efficiency of semiconductor lasers to single mode fibers using a waveguide structure placed between the laser and the fiber.

BACKGROUND OF THE INVENTION

The amount of light that can be injected directly from a semiconductor laser into a cleaved single mode fiber is limited by the modal mismatch of these two waveguiding structures. This limitation is due to the modal mismatch between the highly diverging laser beam and the small numerical aperture of the fiber. The laser spot size is typically around 1 $\mu$m while that of a fiber is around 10 $\mu$m. This disparity limits the coupling efficiency between these two devices to about 10%, if perfectly aligned. In many communication systems there is a need for high optical power at a low laser drive current. In particular, in the local loop of the telephone system one needs to split the optical signal and send it to multiple of customers. The coupled power may limit the number of splits possible. A number of techniques have been devised to increase the coupling efficiency of light into a fiber. These include modifying the shape of the fiber end (tapering or flame lensing or both) so that the modal mismatch is reduced. However, the coupling efficiency is improved at the expense of very tight alignment tolerances. Uptapered fibers have been also shown to perform well, but there is a need for an additional lens between the laser and the modified fiber. This makes the assembly difficult. Still another approach is to modify the laser structure so that it has a tapered output section thus increasing the laser spot size in the junction plane. This technique increases the coupling efficiency, but only for spatially fabricated lasers. Moreover, the performance characteristics of these lasers may not be adequate for the intended purpose. A yet further approach involves positioning a tapered waveguide with a graduated index of refraction between a laser and the fiber or the technique disclosed by Shani et al. whereby two nested waveguides, one matching the laser mode and the second matching the fiber mode are utilized. These approaches work well, however, they are complicated and difficult to make.

OBJECTS OF THE INVENTION

Accordingly, it is a primary of this invention to obviate the above noted and other disadvantages of the prior art.

It is a further object of the invention to provide a novel apparatus for efficient coupling of a laser to a fiber.

It is a yet further object of the invention to provide a novel apparatus for efficient coupling of a laser to a fiber in a semiconductor package.

It is still further object of the invention to provide a multi stage waveguide structure for efficient coupling of a laser to a fiber in a semiconductor package.

SUMMARY OF THE INVENTION

The above and other objects and advantages are achieved in one aspect of this invention by providing for a waveguide structure on a semiconductor package for coupling the light from a laser to a single mode fiber. The laser having a gaussian mode field radius (MFR) $\omega_l$ is coupled via a waveguide to the fiber with a gaussian mode field radius $\omega_f$. To enhance coupling efficiency, the spot size of the waveguide is designed to be the geometrical mean of the MFR of the laser and the MFR of the fiber.

In another aspect of the invention a waveguide structure consisting of multiple stages is provided for enhancing coupling efficiency of a laser to a single mode fiber. Each successive stage is designed to have a spot size which is the geometric mean of the section before and after. With only a small number of stages significant improvement in coupling efficiency can be realized

BRIEF DESCRIPTION OF THE DRAWINGS

For a better understanding of the present invention, together with other objects, advantages and capabilities thereof, reference is made to the following Description and appended Claims, together with the Drawings, in which:

DETAILED DESCRIPTION OF THE INVENTION

Figure 1:
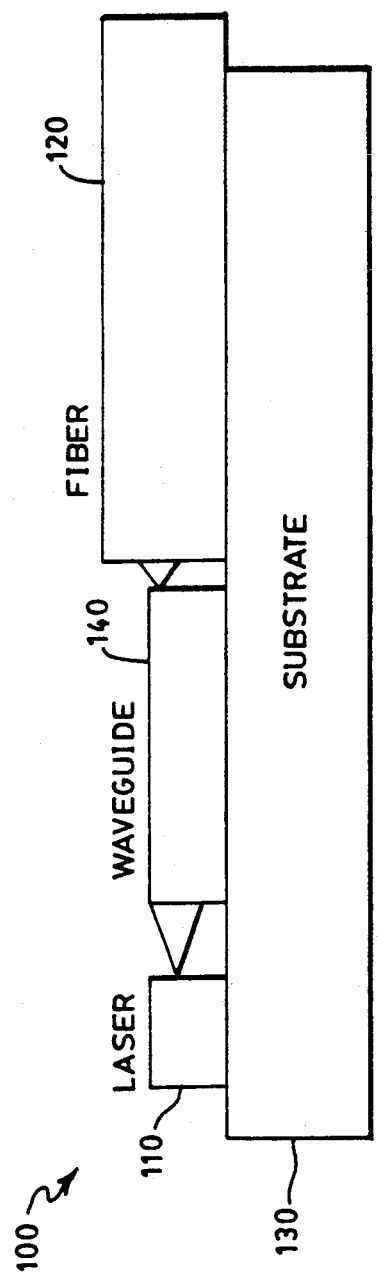
FIG. 1 illustrates an optoelectronic package for coupling the output of a laser to a single mode fiber in accordance with the current invention.

Referring to FIG. 1 wherein is shown an optoelectronic package 100 for the coupling of the output of a laser 110 to an optical fiber 120. Both the laser 110 and the optical fiber 120 are mounted on a substrate 130 for support. A between the laser 110 and the optical fiber 120 for more efficient coupling as will later be described. The waveguide 140 is fabricated on a silicon substrate, and a v-groove may be etched into the silicon to facilitate automatic location of the fiber. Optical waveguides on silicon have been made by a variety of methods including flame hydrolysis, phosphorous doping, plasma enhanced chemical vapor deposition and deposition by electron cyclotron resonance based machines. Propagation losses demonstrated with any of these techniques are always very low (fractions of decibels per centimeter), so that propagation of light through a waveguide does not introduce excess losses.

Referring again to FIG. 1, a laser 110 with a gaussian mode field radius (MFR) $\omega_l$ is coupled to a fiber 120 with a gaussian mode field radius $\omega_f$. The coupling efficiency is determined by the overlap between the two gaussians $$\eta_o = \frac{4}{\left(\frac{\omega_l}{\omega_f} + \frac{\omega_f}{\omega_l}\right)^2}$$

If a waveguide 140 is inserted between the laser 110 and the fiber 120, the total coupling efficiency is the product of the two, namely, $$\eta = \eta_1 \times \eta_2 = \frac{4}{\left(\frac{\omega_l}{\omega_g}+\frac{\omega_g}{\omega_l}\right)^2} \times \frac{4}{\left(\frac{\omega_g}{\omega_f}+\frac{\omega_f}{\omega_g}\right)^2}$$

where $\omega_g$ is a waveguide MFR and $\eta_1$ and $\eta_2$ refer to the coupling efficiency at the two interfaces. The total coupling efficiency, $\eta$, is a maximum when $\omega_g=(\omega_l\omega_f)^{\frac{1}{2}}$.

Figure 2:
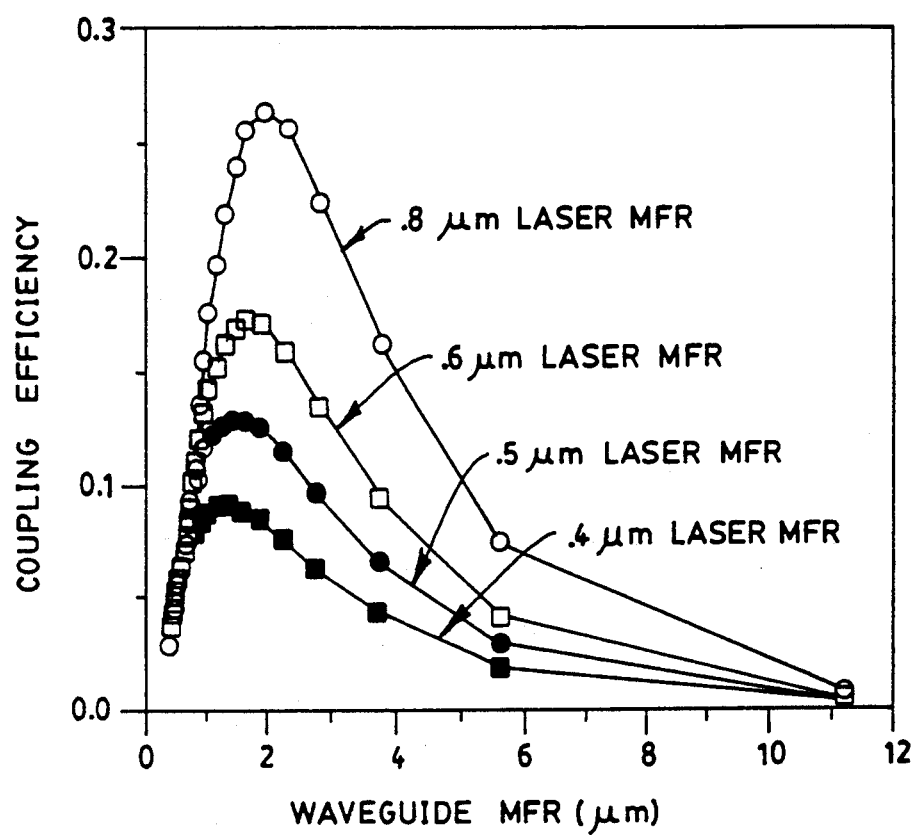
FIG. 2 is a plot of coupling efficiency as a function of a waveguide mode field radius for four lasers with varying spot sizes coupled to single mode fiber with a mode field radius of 5 $\mu$m.

Thus for a uniform cross section waveguide, the spot size should be the geometrical mean of that of the laser and the fiber. FIG. 2 is a plot of $\eta$ as a function of the waveguide mode field radius for four lasers with varying spot sizes coupled to single mode fiber with a mode field radius of 5 μm.

The improvement factor, R, in the coupled power for the optimal waveguide dimensions is $$R = \frac{\eta}{\eta_o} = \frac{4\left(\left(\frac{\omega_l}{\omega_f}\right)^2+1\right)^2}{\left(\frac{\omega_l}{\omega_f}+1\right)^4}$$

Figure 3:
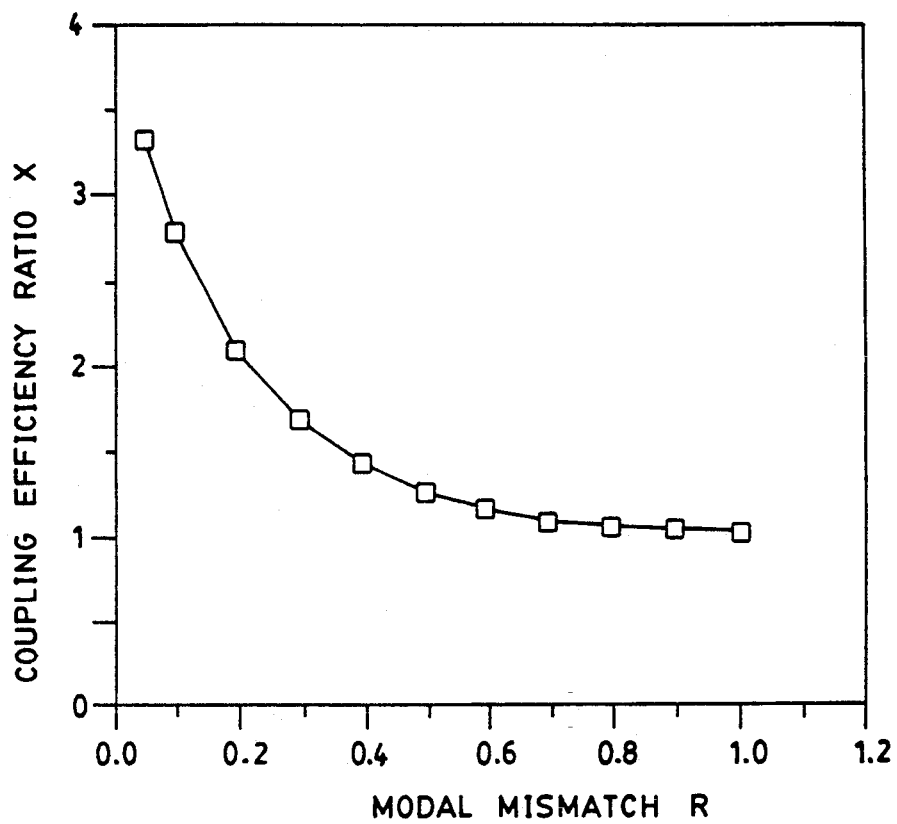
FIG. 3, is a plot of the improvement factor, R, in the coupled power for optimal waveguide dimensions versus the mode field radius (MFR) ratio of a laser and a fiber.

In FIG. 3, R is plotted Versus the MFR ratio, $\omega_l/\omega_f$. As expected, the coupling improvement increases with increased mismatch between the laser and the fiber. It reaches the maximum value of 4 for a highly mismatched situation. In order to increase the coupled power even further, the waveguide must be expanded at the fiber end. This can be done in steps or in a continuous manner.

Figure 4:
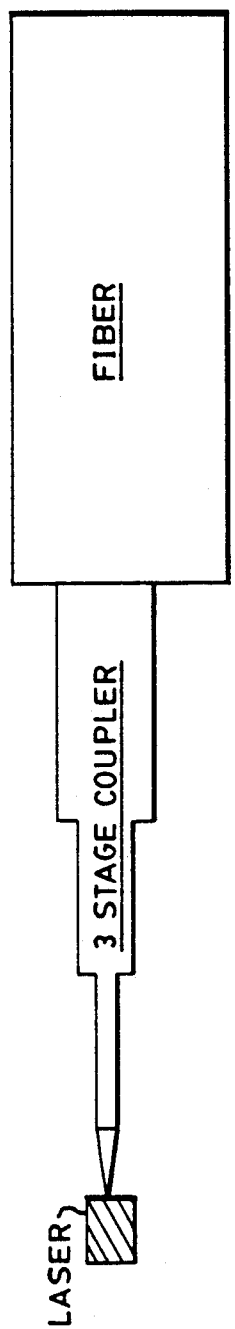
FIG. 4 shows the geometry of a 3 stage coupler.

The apparatus described above can be extended to multi-stage couplers. FIG. 4 shows the geometry of a 3 stage coupler. Each successive stage is designed to have a spot size which is the geometric mean of the section before and after. With only a small number of stages significant improvement in coupling efficiency can be realized. Fabrication of single or multistage couplers as discussed above can be made by single or multiple etching process followed by redepositing of a cladding layer. These steps are the same as in fabrication of any waveguide structure and are well known to those of ordinary skill in the art. No additional fabrication complexity is introduced.

For a multi-stage waveguide composed of segments with mode field radii (MFR) satisfying $(\omega_1\omega_f)^{\frac{1}{2}}$ the ratio of the MFRs of consecutive segments is given by $$\omega_k/\omega_{k-1}=(\omega_f/\omega_1)^{1/(n+1)}=r^{1/(n+1)}$$

where n is the number of waveguide segments and $\omega_f/\omega_1=4$.

The coupling efficiency is thus:

$$\eta_2=(4/(r^{1/n+1}+r^{-1/n+1})^2)^{n+1}$$

This expression describes the coupling efficiency between a laser and a fiber using a waveguide expanding in both lateral and transverse directions. Somewhat easier to fabricate is a waveguide expanding in the lateral dimension only. For this approach a single etching step is required followed by regrowth of a cladding layer. The coupling efficiency is given by $$\eta_1=(2/(r^{\frac{1}{2}}+r^{-\frac{1}{2}}))^2\cdot(2/r^{1/n+1}+r^{-1/n+1})^{n+1}$$

Figure 5:
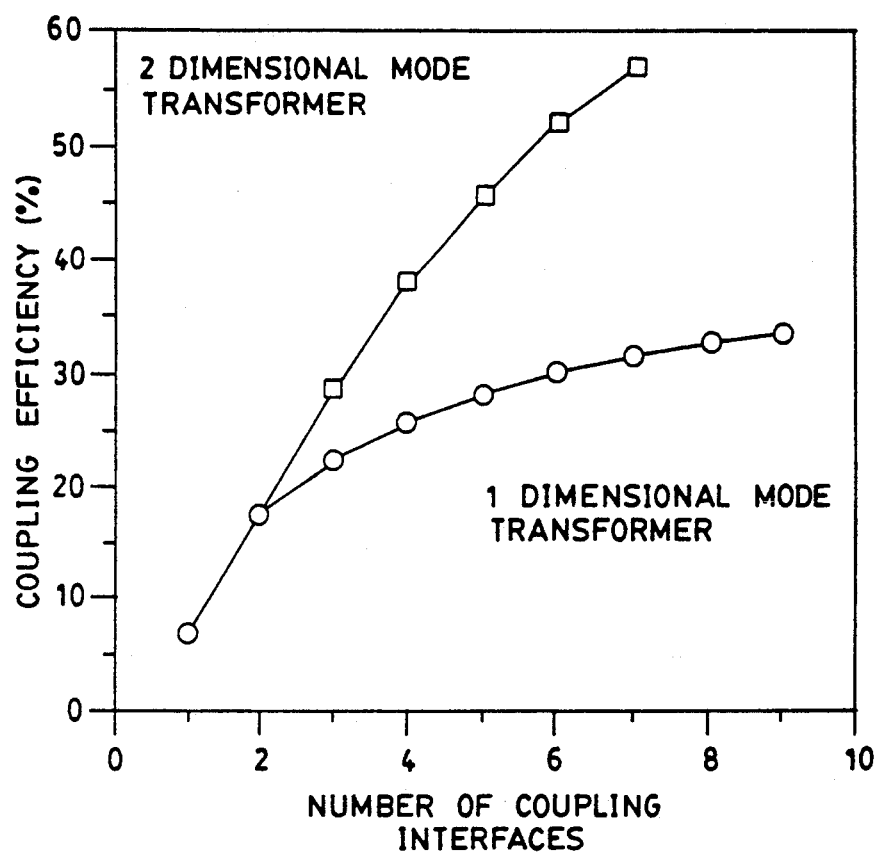
FIG. 5 is a graph wherein both $\eta 1$ and $\eta 2$ are plotted as a function of the number of waveguide segments.

In FIG. 5 both $\eta_1$ and $\eta_2$ are plotted as a function of the number of waveguide segments. The coupling efficiency for the waveguide expanded in two dimensions produces higher coupling for a given number of segments larger than one. In the limit of large number of segments the coupling efficiency approaches 100%. For the waveguide expanding in only one dimension, the asymptotic value approaches the square root of the single segment coupler, in the case shown, 41%. The expressions for $\eta_1$ and $\eta_2$ can be generalized to a continuously expanding waveguide to give for the two dimensional case the MFR as a function of distance along the propagation direction $$\omega(z)=\omega_1\cdot(\omega_f/\omega_1)^{z/L}$$

where L is the total length of the waveguide.

While there has been shown and described what is at present considered the preferred embodiment of the invention it will be obvious to those skilled in the art that various changes and modifications may be made therein without departing from the invention as defined by the appended claims.

What is claimed is:

1. An optoelectronic system for enhancing the coupling of the output of a laser to a fiber comprising:
    a laser means for transmitting light and having a mode field radius of $\omega_1$;
    a fiber means for receiving the transmitted light of said laser means and having a mode field radius of $\omega_f$;
    a waveguide means for guiding the output light of said laser means to said fiber means and having a mode field radius of $(\omega_1\omega_f)^{\frac{1}{2}}$.

2. The optoelectronic system of claim 1 wherein said waveguide means is mounted on a substrate.

3. The optoelectronic system of claim 2 wherein said substrate is formed of semiconductor material.

4. The optoelectronic system of claim 1 wherein said fiber means is amounted on a substrate.

5. The optoelectronic system of claim 4 wherein said substrate includes v-grooves for positioning said fiber means.

6. An optoelectronic system for enhancing the coupling of the output of a laser to a fiber comprising:
    a laser means for transmitting light and having a mode field radius of $\omega_1$;
    a fiber means for receiving the transmitted light of said laser means and having a mode field radius of $\omega_f$;
    a plurality of waveguide means cascaded for guiding the output light of said laser means to said fiber means, each waveguide means having a mode field radius;
    wherein the mode field radius of the first of said cascaded waveguide means is the geometrical mean of the mode field radii of the laser means and the next subsequent waveguide means.

7. The optoelectronic system of claim 6 wherein said plurality of waveguide means are mounted on a substrate.

8. The optoelectronic system of claim 7 wherein said substrate is formed of semiconductor material.

9. The optoelectronic system of claim 6 wherein said fiber means is mounted on a substrate.

10. The optoelectronic system of claim 9 wherein said substrate includes v-grooves for positioning said fiber means.

11. The optoelectronic system of claim 6 wherein the mode field radius of the last of said cascaded waveguide means is the geometrical mean of the mode field radii of the fiber means and the previous waveguide means.

12. The optoelectronic system of claim 6 wherein the mode field radius of one of said cascaded waveguide means other than the first or last waveguide means is the geometrical mean of the mode field radii of the previous waveguide means and the next subsequent waveguide means.

* * * * *